United States Patent [19]
Foote et al.

[11] Patent Number: 5,369,477
[45] Date of Patent: Nov. 29, 1994

[54] LIQUID ELECTROPHOTOGRAPHY FLUID CONTAINMENT AND BELT TRACKING DEVICE

[75] Inventors: Wayne E. Foote, Eagle; Paul L. Jeran, Boise, both of Id.

[73] Assignee: Hewlett-Packard Company, Palo Alto, Calif.

[21] Appl. No.: 164,122

[22] Filed: Dec. 7, 1993

[51] Int. Cl.$^5$ .................. G03G 15/10; B65G 15/60
[52] U.S. Cl. ........................... 355/256; 68/202; 198/840
[58] Field of Search ............... 355/256, 212; 118/659; 68/202, 200, 97; 198/840, 821

[56] References Cited

U.S. PATENT DOCUMENTS

| | | | |
|---|---|---|---|
| 722,252 | 3/1903 | Richards | 198/821 |
| 3,327,839 | 6/1967 | Sigety et al. | 198/840 |
| 3,766,887 | 10/1973 | Sato et al. | 355/256 X |
| 3,910,231 | 10/1975 | Inoue et al. | 355/259 X |
| 4,043,658 | 8/1977 | Inoue et al. | 355/256 |
| 4,667,812 | 5/1987 | Wixey | 198/821 |

*Primary Examiner*—A. T. Grimley
*Assistant Examiner*—Nestor R. Ramirez

[57] ABSTRACT

A liquid electrophotography fluid containment and belt tracking device has a rubber or other elastomeric profile fixed to both edges of a photoconducting belt to provide both belt tracking control and fluid edge effects control. The part of the profile that extends from the inside surface of the belt is used as a tracking rail. A mating profile is machined into the belt rollers to provide tracking control. The part of the profile that extends from the outside surface of the belt is used to seal the edge to the squeegee roller to prevent fluid from moving around the end of the squeegee roller.

12 Claims, 4 Drawing Sheets

LIQUID ELECTROPHOTOGRAPHY FLUID CONTAINMENT AND BELT TRACKING DEVICE

BACKGROUND OF THE INVENTION

1. Technical Field

This invention generally relates to electrophotography, and more particularly, this invention relates to management and control of both a photoconducting belt and the liquid toner applied to the belt.

2. Background Art

Two problems, which are encountered when using a belt as a photoconductor in a liquid electrophotographic print engine, are solved by this invention. The first problem is proper belt tracking. If a belt is placed over two parallel rollers and rotated by means of rotating one of the rollers, the belt will tend to move towards one end of the rollers over time. This is a fact well recognized in the industry. This movement must be prevented or limited to prevent the belt from moving an excessive distance from its intended position. Many methods are used in the industry to prevent belt movement. Some of these are crowning of the rollers, belt edge contact, dynamic steering of one of the rollers, sprocket drive mechanisms, and tracking rails fixed to the belt that run in grooves in the rollers. This invention makes use of the last mentioned method.

The second problem that this invention addresses is unique to liquid electrophotography. After the liquid image is placed on the belt, a squeegee roller is used to press off excessive toner and to press the image tighter onto the belt surface. When using a roller that is shorter than the belt width, the fluid being pressed ahead of the squeegee roller can escape from the ends of the rollers. This fluid can then be pulled from the ends of the roller into the area behind the squeegee by capillary action. This liquid ruins the image that has been created and the lost fluid reduces the life of the consumable toner cartridge. There is a need to control these edge effects.

FIGS. 1 and 2 of the drawings illustrate a typical prior art belt-type photoconductor 2 employed in electrophotographic devices such as a laser printer 1. FIG. 1 is a simplified block diagram schematic of a liquid toner laser printer 1 having a belt-type photoconductor 2 on which four separate developers, magenta developer 7, yellow developer 8, cyan developer 9 and black developer 10, act to deposit toner. The first step in the color image forming process, at least in this simplified explanation, is to deposit a charge pattern on the photoconductor. This is accomplished by laser 11 which is modulated by a data stream representing color separated components of a color image. Starting with the yellow bit map first, laser 11 deposits a charge pattern on belt 2 which represents the full page yellow component image. Yellow toner is then applied to belt 2 by yellow developer unit 8. A squeegee roller 12, within each developer unit, is applied to belt 2 to remove any excess liquid toner which may accumulate on belt 2 and affix the image to belt 2. This process is repeated for each of the cyan, magenta and black component images, after which the entire image is transferred to the print media via transfer roller 13.

FIG. 2 is a detail partial cross-section view of the photoconducting belt taken across the length of the belt. The photoconducting belt 2 of the prior art generally has an organic photoconducting material impregnated in, or otherwise bonded to, a plastic film substrate such as Mylar TM. A pair of tracking ridges 3 are formed from an elastomeric material along the inside marginal edges of belt 2 to interact with tracking grooves 6 on either the drive roller 4 or idler roller 5 of the apparatus, with clearance grooves on the other roller. Accurate belt registration and tracking is critical in electrophotographic devices employing belt photoconductors and is especially critical if a belt-type photoconductor is to be used in color printing where multiple passes of the belt are necessary in order to deposit the four component colors onto the belt to form the image.

An additional concern in liquid electrophotography is preventing excess liquid toner which accumulates in the nip area of squeegee rollers 12 from migrating around the ends of the squeegee rollers and contaminating the exposed image area of belt 2. It is therefore a primary object of this invention to provide an accurate belt tracking mechanism which doubles as a mechanism to inhibit excess liquid toner from contaminating the deposited image on the belt.

SUMMARY OF THE INVENTION

This invention uses a rubber or other elastomeric profile fixed to both edges of the belt to provide both belt tracking control and fluid edge effects control. The part of the profile that extends below the surface of the belt is used as a tracking rail. A mating profile is machined into the rollers to provide tracking control. The part of the profile that extends above the surface of the belt is used to seal the edge to the squeegee roller to prevent fluid from moving around the end of the roller.

Although both tracking and fluid control are accomplished with one part, the bottom surface of the profile can be optimized for best tracking control and the top part of the profile can be optimized for best fluid control by providing different shaped profiles or a combination of a contoured profile and a complimentary shaped edge profile on the squeegee rollers.

It should be noted that this invention is equally applicable to monochromatic, as well as multi-color, liquid toner image forming devices.

DETAILED DESCRIPTION OF THE INVENTION

Figure 3:
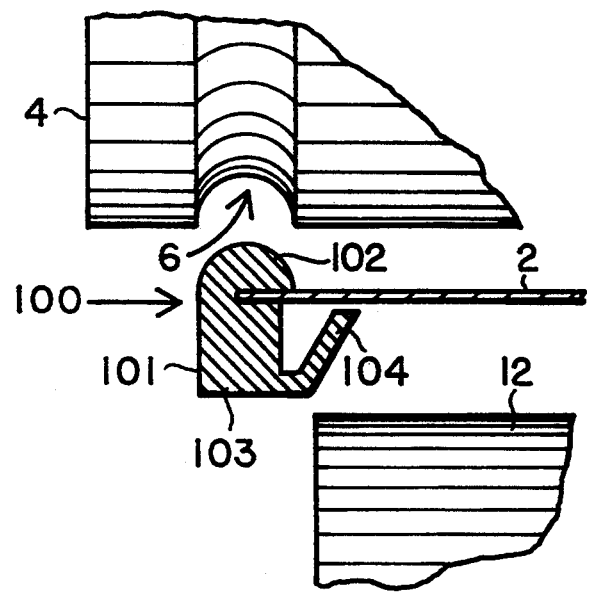
FIG. 3 is a detail partial cross-section view of a photoconducting belt including a first embodiment of the fluid containment and belt tracking device according to the present invention.

Referring additionally now to FIGS. 3 through 11, the fluid containment and belt tracking device is illustrated in detail, a first embodiment being generally designated as 100 in FIG. 3, and is explained in the following detailed description. Alternate second, third, fourth, fifth, sixth, seventh, eighth and ninth embodiments are designated as 200, 300, 400, 500, 600, 700, 800 and 900, respectively. It should be noted that while nine configurations are shown and described, other configurations are possible and could be easily implemented within the principles of the present invention.

Fluid containment and belt tracking device 100 has a resilient profile 101 bonded or otherwise attached to the marginal edges of belt 2. Resilient profile 101 has a tracking rail portion 102 which extends from the inside of belt 2 and which is shaped to closely conform to the contour of tracking groove 6 in drive roller 4 or idler roller 5. A containment ridge 103, which is also a part of resilient profile 101, extends from the outside of belt 2 and is shaped and positioned to seal against the marginal edge of squeegee rollers 12. Here, a sealing flange 104 extends inwardly from the inner distal edge of containment ridge 103 to form a sealing mechanism which operates against the outside edges of squeegee rollers 12.

Figure 1:
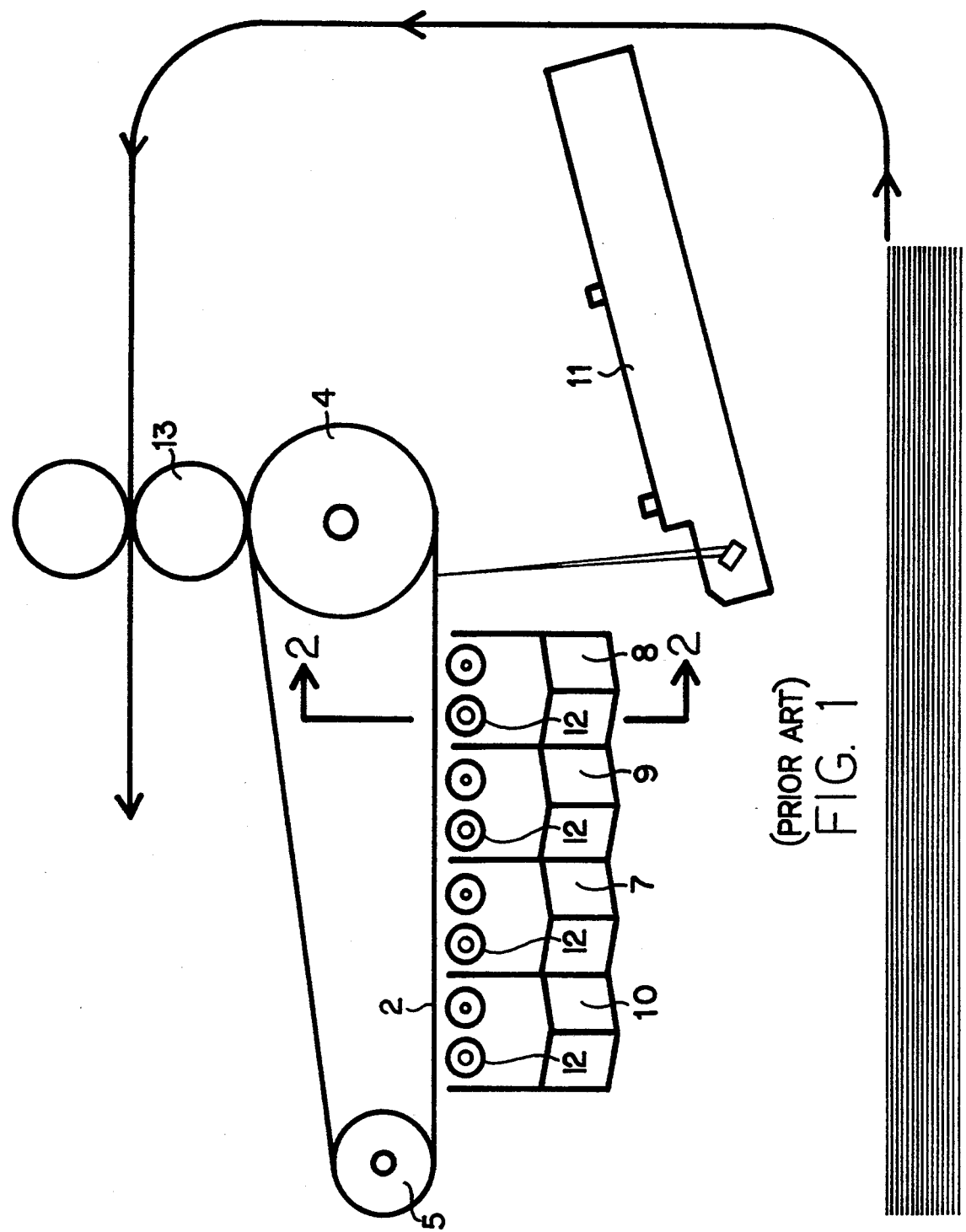
FIG. 1 is a simplified block diagram schematic of a prior art liquid toner laser printer employing a belt-type photoconductor.
Figure 2:
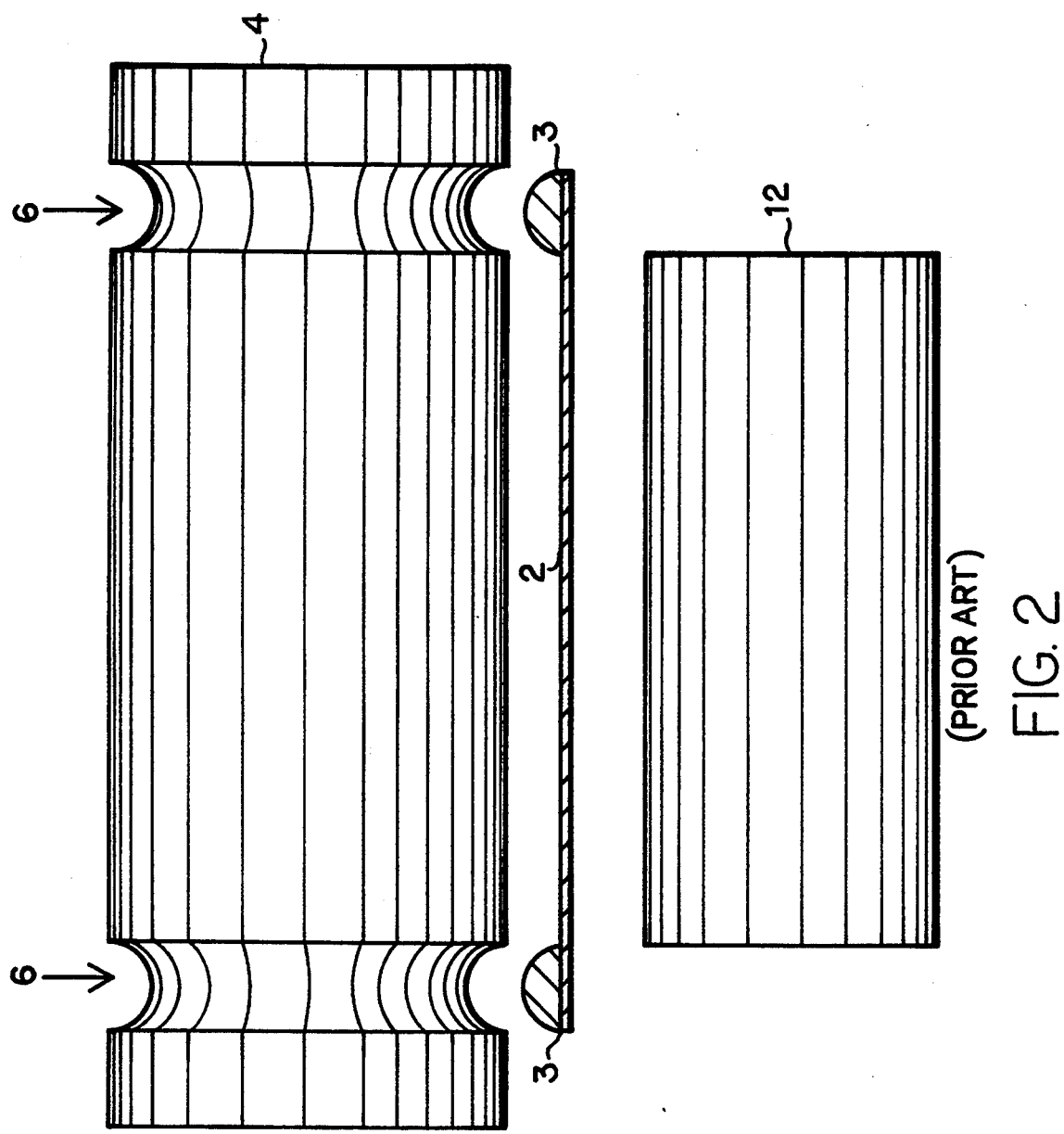
FIG. 2 is an exploded detail view of the drive roller and the squeegee roller along with a partial cross-section view of the photoconducting belt of the prior art taken across the length of the belt along section line 2—2 of FIG. 1.
Figure 9:
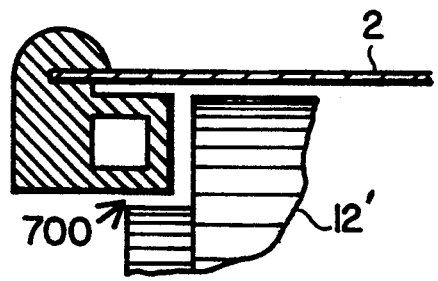
FIG. 9 is a detail partial cross-section view of a photoconducting belt including a seventh embodiment of the fluid containment and belt tracking device according to the present invention.
Figure 10:
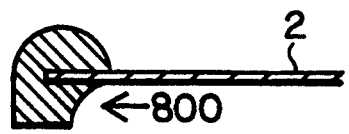
FIG. 10 is a detail partial cross-section view of a photoconducting belt including an eighth embodiment of the fluid containment and belt tracking device according to the present invention.
Figure 8:
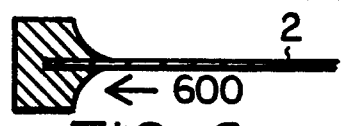
FIG. 8 is a detail partial cross-section view of a photoconducting belt including a sixth embodiment of the fluid containment and belt tracking device according to the present invention.
Figure 6:
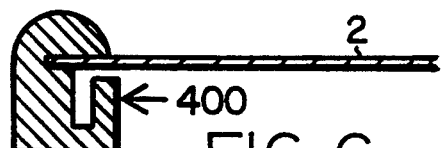
FIG. 6 is a detail partial cross-section view of a photoconducting belt including a fourth embodiment of the fluid containment and belt tracking device according to the present invention.
Figure 7:
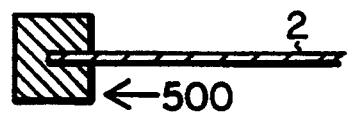
FIG. 7 is a detail partial cross-section view of a photoconducting belt including a fifth embodiment of the fluid containment and belt tracking device according to the present invention.
Figure 4:
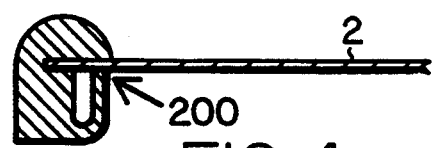
FIG. 4 is a detail partial cross-section view of a photoconducting belt including a second embodiment of the fluid containment and belt tracking device according to the present invention.
Figure 5:
FIG. 5 is a detail partial cross-section view of a photoconducting belt including a third embodiment of the fluid containment and belt tracking device according to the present invention.

FIGS. 4 through 11 illustrate alternate configurations for the resilient profile which can be used in conjunction with a standard flat edged squeegee roller 12, such as that shown in FIG. 3, or with a modified edge shape, such as that shown on squeegee roller 12' in FIG. 9. For example, the rounded profile of fluid containment and belt tracking device 300 could be used in conjunction with cove shaped edged squeegee rollers. As another example, the cove shaped profiles of fluid containment and belt tracking devices 600 and 800 could be used in conjunction with rounded edged squeegee rollers.

Figure 11:
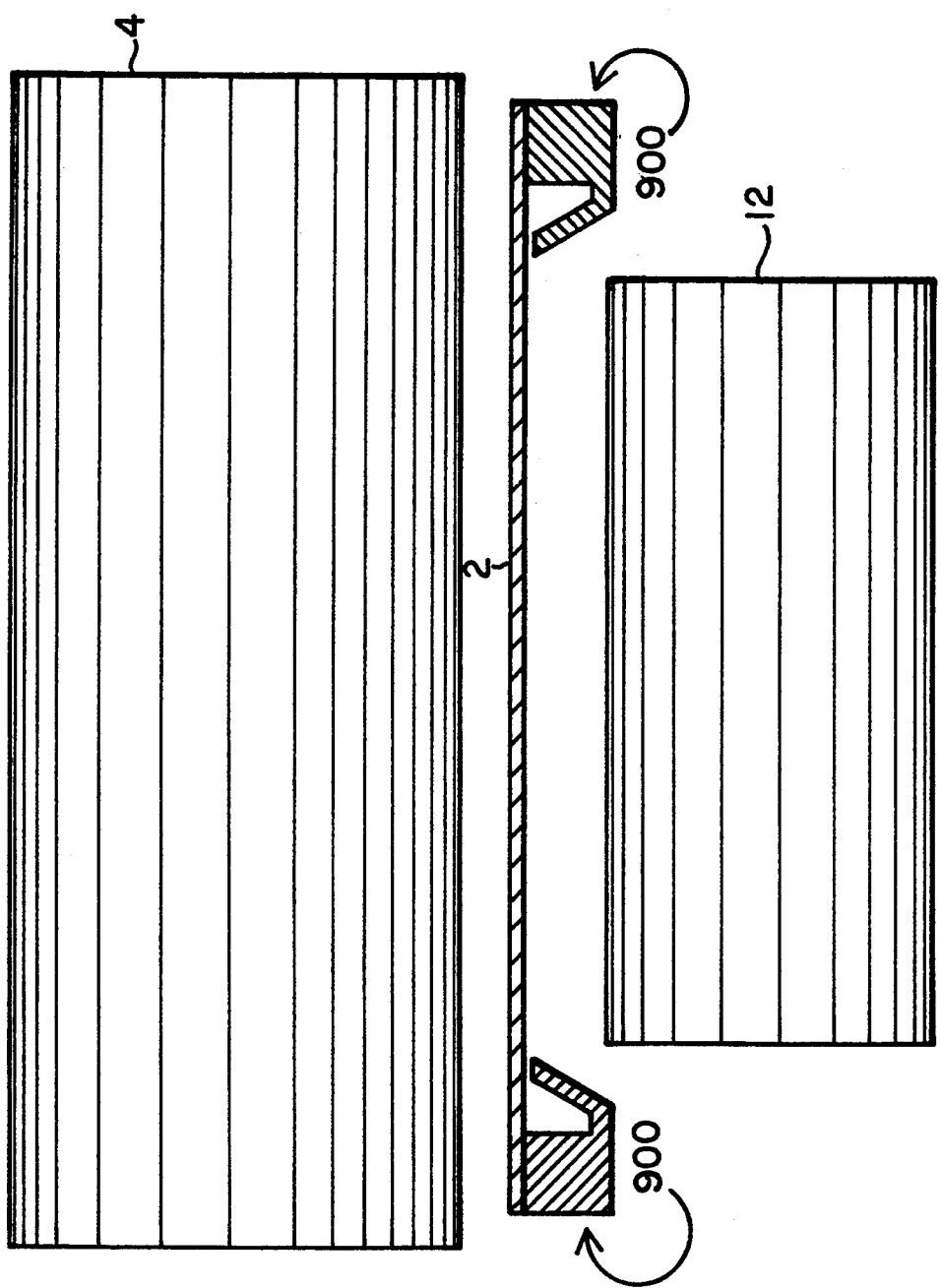
FIG. 11 is an exploded detail view of the drive roller and the squeegee roller along with a partial cross-section view of the photoconducting belt of a ninth embodiment of the fluid containment and belt tracking device according to the present invention.

FIG. 11 illustrates an alternate embodiment of fluid containment and belt tracking device 900 which eliminates the tracking profile portion. This embodiment implements fluid containment and control in a belt-type photoconductor image forming apparatus which uses other forms of belt tracking such as crowning of the rollers, belt edge contact, dynamic steering of one of the rollers or sprocket drive mechanisms.

It should be apparent to one skilled in the art that there exist many different elastomeric and other resilient materials which are suitable for this invention. Additionally, standard methods of manufacture can be used to produce the resilient profile as well as attaching it to photoconducting belt 2.

While there is shown and described the present preferred embodiment of the invention, it is to be distinctly understood that this invention is not limited thereto but may be variously embodied to practice within the scope of the following claims.

What is claimed is:

1. A liquid toner image forming device for printing which comprises:

exposure means for forming a charge pattern on a photoconductor;

a photoconductor including a continuous belt for holding the charge pattern, the belt having an inside surface, an outside surface and two marginal edges;

developing means for applying liquid toner to the charge pattern, the developing means including a squeegee roller, having marginal edges, for removing excess toner from the belt and aiding affixing of the toner to the charge pattern;

a pair of resilient profiles, each being attached to a marginal edge of the belt, the profiles each having a tracking rail portion extending from the inside surface of the belt and a containment ridge portion extending from the outside surface of the belt, the containment ridge portions being positioned and configured to seal against the marginal edges of the squeegee roller; and image transfer means for transferring an image affixed to the belt from the belt to a print medium.

2. The image forming device of claim 1 further comprising a sealing flange being attached to and extending inwardly from distal edges of the containment ridge portions to form a sealing mechanism which operates against the squeegee roller.

3. The image forming device of claim 1 wherein the resilient profiles have a circular shape.

4. The image forming device of claim 1 wherein the resilient profiles have a rectangular shape.

5. The image forming device of claim 1 wherein the tracking rail portions are each shaped as a semi-circle.

6. The image forming device of claim 5 further comprising a sealing flange being attached to and extending inwardly from distal edges of the containment ridge portions to form a sealing mechanism which operates against the squeegee roller.

7. The image forming device of claim 5 wherein the containment ridge portions include a cove shaped portion contoured to receive the squeegee roller.

8. The image forming device of claim 2 wherein the containment ridge portions include a cove shaped portion contoured to receive the squeegee roller.

9. The image forming device of claim 1 wherein the containment ridge portions include a cove shaped portion contoured to receive the squeegee roller.

10. A liquid toner image forming device for printing which comprises:

exposure means for forming a charge pattern on a photoconductor;

a photoconductor including a continuous belt for holding the charge pattern, the belt having an inside surface, an outside surface and two marginal edges;

developing means for applying liquid toner to the charge pattern, the developing means including a squeegee roller, having marginal edges, for removing excess toner from the belt and aiding affixing of the toner to the charge pattern;

a pair of resilient profiles, each being attached to a marginal edge of the belt, the profiles each having a containment ridge portion extending from the outside surface of the belt, the containment ridge portions being positioned and configured to seal against the marginal edges of the squeegee roller; and image transfer means for transferring an image affixed to the belt from the belt to a print medium.

11. The image forming device of claim 10 further comprising a sealing flange being attached to and extending inwardly from distal edges of the containment ridge portions to form a sealing mechanism which operates against the squeegee roller.

12. The image forming device of claim 10 wherein the containment ridge portions include a cove shaped portion contoured to receive the squeegee roller.

* * * * *